(12) United States Patent
Kwon et al.

(10) Patent No.: US 8,811,263 B2
(45) Date of Patent: Aug. 19, 2014

(54) METHOD FOR SENDING AN UPLINK CONTROL SIGNAL ON A WIRELESS COMMUNICATIONS SYSTEM AND A DEVICE THEREFOR

(75) Inventors: Yeong Hyeon Kwon, Anyang-si (KR); Min Seok Noh, Anyang-si (KR); Kyu Jin Park, Anyang-si (KR); Jae Hoon Chung, Anyang-si (KR); Seung Hee Han, Anyang-si (JP); So Yeon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 115 days.

(21) Appl. No.: 13/382,517

(22) PCT Filed: Jul. 8, 2010

(86) PCT No.: PCT/KR2010/004450
§ 371 (c)(1),
(2), (4) Date: Jan. 5, 2012

(87) PCT Pub. No.: WO2011/005040
PCT Pub. Date: Jan. 13, 2011

(65) Prior Publication Data
US 2012/0106438 A1    May 3, 2012

Related U.S. Application Data

(60) Provisional application No. 61/224,471, filed on Jul. 10, 2009.

(51) Int. Cl.
*H04W 88/04* (2009.01)
*H04W 72/12* (2009.01)
*H04L 27/26* (2006.01)
*H04W 72/04* (2009.01)

(52) U.S. Cl.
CPC ...... *H04W 72/1242* (2013.01); *H04W 72/1268* (2013.01); *H04W 72/042* (2013.01); *H04L 27/2605* (2013.01)
USPC ........... 370/315; 370/330; 370/341; 370/441; 370/442; 370/476; 455/451; 455/452.2

(58) Field of Classification Search
CPC .......... H04W 72/042; H04W 72/1268; H04W 72/1242; H04W 72/04; H04W 88/04; H04L 27/2605; H04L 5/0007
USPC ............ 370/329, 330, 341, 374.41, 441, 442, 370/436, 476; 455/450–452.2
See application file for complete search history.

(56) References Cited

U.S. PATENT DOCUMENTS 8,630,240 B2 * 1/2014 Shen et al. ..................... 370/329
2008/0225788 A1 * 9/2008 Inoue et al. .................... 370/329

(Continued)

FOREIGN PATENT DOCUMENTS

| KR | 1020080035437 | 4/2008 |
|----|---------------|--------|
| KR | 1020080087646 | 10/2008 |
| KR | 1020090028401 | 3/2009 |

*Primary Examiner* — Andrew Chriss
*Assistant Examiner* — Rasha Fayed
(74) *Attorney, Agent, or Firm* — Lee, Hong, Degerman, Kang & Waimey

(57) ABSTRACT

Disclosed in a method whereby a terminal sends an uplink control signal on a wireless communication system. More specifically, the present invention comprises the steps of generating an uplink control signal, allocating uplink sending resources to the uplink control signal, and sending the uplink control signal to a base station; a time resource in the uplink transmission resources is divided into sub-frame units divided into two slots; at least one of the two slots comprises one reference symbol for transmitting a reference signal; and in the slot comprising the one reference symbol, at least one of a plurality of data symbols for transmitting data signals is dropped.

10 Claims, 16 Drawing Sheets

(56) References Cited

U.S. PATENT DOCUMENTS

| | | |
|---|---|---|
| 2009/0109908 A1* | 4/2009 | Bertrand et al. ............. 370/329 |
| 2010/0040005 A1* | 2/2010 | Kim et al. .................... 370/329 |
| 2010/0080139 A1* | 4/2010 | Palanki et al. ............... 370/252 |
| 2010/0195614 A1* | 8/2010 | Nimbalker et al. .......... 370/330 |
| 2010/0226326 A1* | 9/2010 | Ahn et al. .................... 370/329 |
| 2010/0322115 A1* | 12/2010 | Wei et al. ..................... 370/280 |
| 2011/0096783 A1* | 4/2011 | Cai et al. .................... 370/395.4 |
| 2013/0016694 A1* | 1/2013 | Nimbalker et al. .......... 370/330 |

* cited by examiner

Single Component Carrier (e.g. LTE System)

METHOD FOR SENDING AN UPLINK CONTROL SIGNAL ON A WIRELESS COMMUNICATIONS SYSTEM AND A DEVICE THEREFOR

CROSS-REFERENCE TO RELATED APPLICATIONS

This application is the National Stage filing under 35 U.S.C. 371 of International Application No. PCT/KR2010/004450, filed on Jul. 8, 2010, which claims the benefit of U.S. Provisional Application Ser. No. 61/224,471, filed on Jul. 10, 2009, the contents of which are all incorporated by reference herein in their entirety.

TECHNICAL FIELD

The present invention relates to a wireless communication system. More particularly, the present invention relates to a method for transmitting an uplink control signal in a user equipment of a wireless communication system and an apparatus therefor.

BACKGROUND ART

As an example of a mobile communication system to which the present invention is applicable, a 3rd Generation Partnership Project Long Term Evolution (hereinafter, "LTE") communication system will now be described in brief.

FIG. 1 is a diagram schematically showing a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (or eNBs), and an Access Gateway (AG) which is located at an end of the network (E-UTRAN) and connected to an external network. The eNode Bs may simultaneously transmit multiple data streams for a broadcast service, a multicast service, and/or a unicast service.

One or more cells may exist in one eNode B. A cell is configured to use one of bandwidths of 1.25, 2.5, 5, 10, and 20 MHz to provide a downlink or uplink transport service to several UEs. Different cells may be configured to provide different bandwidths. The eNode B controls data transmission and reception for a plurality of UEs. The eNode B transmits downlink scheduling information with respect to downlink data to notify a corresponding UE of a time/frequency domain in which data is to be transmitted, coding, data size, and Hybrid Automatic Repeat and reQuest (HARQ)-related information. In addition, the eNode B transmits uplink scheduling information with respect to uplink data to a corresponding UE to inform the UE of an available time/frequency domain, coding, data size, and HARQ-related information. An interface for transmitting user traffic or control traffic may be used between eNode Bs. A Core Network (CN) may include the AG, a network node for user registration of the UE, and the like. The AG manages mobility of a UE on a Tracking Area (TA) basis, wherein one TA includes a plurality of cells.

Although radio communication technology has been developed up to LTE based on Wideband Code Division Multiple Access (WCDMA), demands and expectations of users and service providers continue to increase. In addition, since other radio access technologies continue to be developed, new technical evolution is required to secure future competitiveness. For example, decrease of cost per bit, increase of service availability, flexible use of a frequency band, simple structure, open interface, and suitable power consumption by a UE are required.

Recently, 3GPP has been establishing a standard task for a subsequent technique of LTE. In this specification, such a technique is referred to as "LTE-Advanced" or "LTE-A". One of the main differences between an LTE system and an LTE-A system is system bandwidth. The LTE-A system is aimed at supporting a broadband of a maximum of 100 MHz, and to this end, the LTE-A system is designed to use a carrier aggregation or bandwidth aggregation technique using a plurality of frequency blocks. Carrier aggregation employs a plurality of component carriers as one large logical frequency band in order to use a wider frequency band. A bandwidth of each component carrier may be defined based on a bandwidth of a system block used in the LTE system.

DETAILED DESCRIPTION OF THE INVENTION

Technical Problems

The present invention is to provide a method for transmitting an uplink control signal in a UE of a wireless communication system and an apparatus therefor.

It will be appreciated by persons skilled in the art that that the effects that can be achieved through the present invention are not limited to what has been particularly described hereinabove and other advantages of the present invention will be more clearly understood from the following detailed description.

Technical Solutions

According to one aspect of the present invention, a method for transmitting an uplink control signal in a user equipment of a wireless communication system includes generating an uplink control signal; allocating an uplink transmission resource to the uplink control signal; and transmitting the uplink control signal to a base station, wherein a time resource out of the uplink transmission resource is classified in the unit of a subframe divided into two slots, one of the two slots includes one reference symbol for transmitting at least one reference signal, and at least one of data symbols for transmitting data signals is dropped in the slot including the one reference symbol.

If the subframe is a backhaul subframe for transmitting the uplink control signal to a relay base station, a first symbol of a first slot of the two slots may be dropped. In this case, the first slot may include one reference symbol for transmitting a reference signal and the one reference symbol may be located in a middle symbol of the first slot.

If the uplink control signal and a sounding reference signal are simultaneously transmitted in the subframe, a last symbol of a second slot of the two slots may be dropped. The second slot may include one reference symbol for transmitting a reference signal and the one reference symbol may be located in a middle symbol among symbols except for a symbol for the sounding reference signal in the second slot.

According to another aspect of the present invention, a user equipment includes a processor for generating an uplink control signal and allocating an uplink transmission resource to the uplink control signal; and a transmission module for transmitting the uplink control signal to a base station, wherein a time resource out of the uplink transmission resource is classified in the unit of a subframe divided into two slots, one of the two slots includes one reference symbol for transmitting at least one reference signal, and at least one of data symbols for transmitting data signals is dropped in the slot including the one reference symbol.

Advantageous Effects

According to embodiments of the present invention, a UE can effectively transmit an uplink control signal to a Base Station (BS) in a wireless communication system.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and constitute a part of the detailed description of the invention, provide embodiments of the invention and together with the detailed description serve to explain the technical spirit of the invention. In the drawings.

BEST MODE FOR CARRYING OUT THE INVENTION

The configuration, operations, and other features of the present invention will be understood readily from the embodiments of the present invention, examples of which are illustrated in the accompanying drawings. The embodiments described later are examples in which technical features of the present invention are applied to a 3GPP system.

Hereinafter, a system, a system band of which uses a single component carrier will be referred to as a legacy system or a narrowband system. By contrast, a system, a system band of which includes a plurality of component carriers and uses at least one or more component carriers as a system block of a legacy system will be referred to as an evolved system or a wideband system. A component carrier used as a legacy system block has the same size as the system block of the legacy system. On the other hand, there is no limitation as to the sizes of the other component carriers. However, for system simplification, the sizes of the other component carriers may be determined based on the size of the system block of the legacy system. For example, a 3GPP LTE system and a 3GPP LTE-A system are legacy system-evolved system relations.

Based on the aforementioned definition, the 3GPP LTE system will herein be referred to as an LTE system or a legacy system. Also, a User Equipment (UE) that supports the LTE system will be referred to as an LTE UE or a legacy UE. The 3GPP LTE-A system will be referred to as an LTE-A system or an evolved system. Also, a UE that supports the LTE-A system will be referred to as an LTE-A UE or an evolved UE.

For convenience, although the embodiments of the present invention will be described based on the LTE system and the LTE-A system, this is an only exemplary and the embodiments of the present invention can be applied to all communication systems corresponding to the aforementioned definition.

Figure 1:
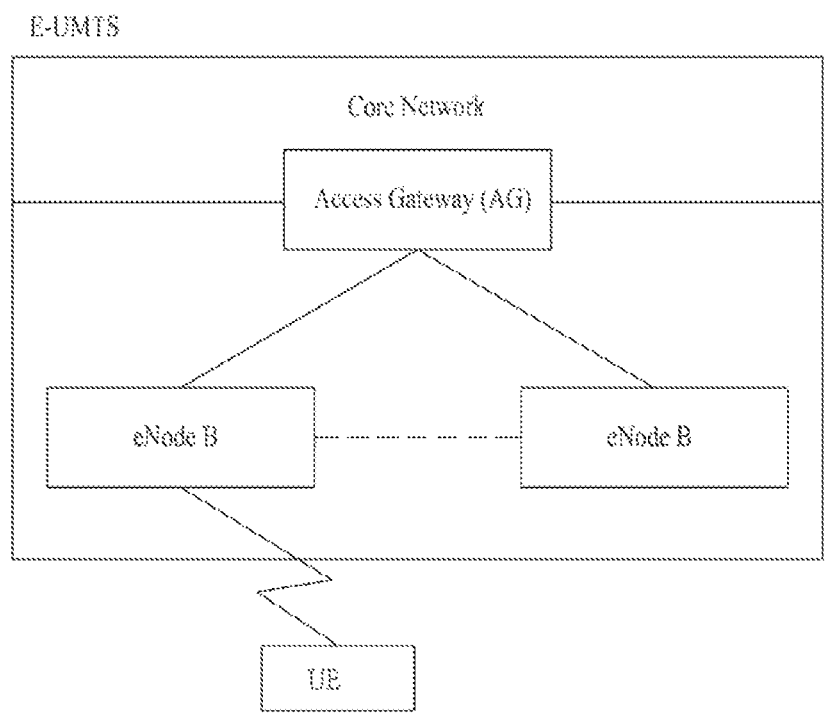
FIG. 1 is a diagram schematically showing a network structure of an E-UMTS as an exemplary radio communication system.
Figure 2:
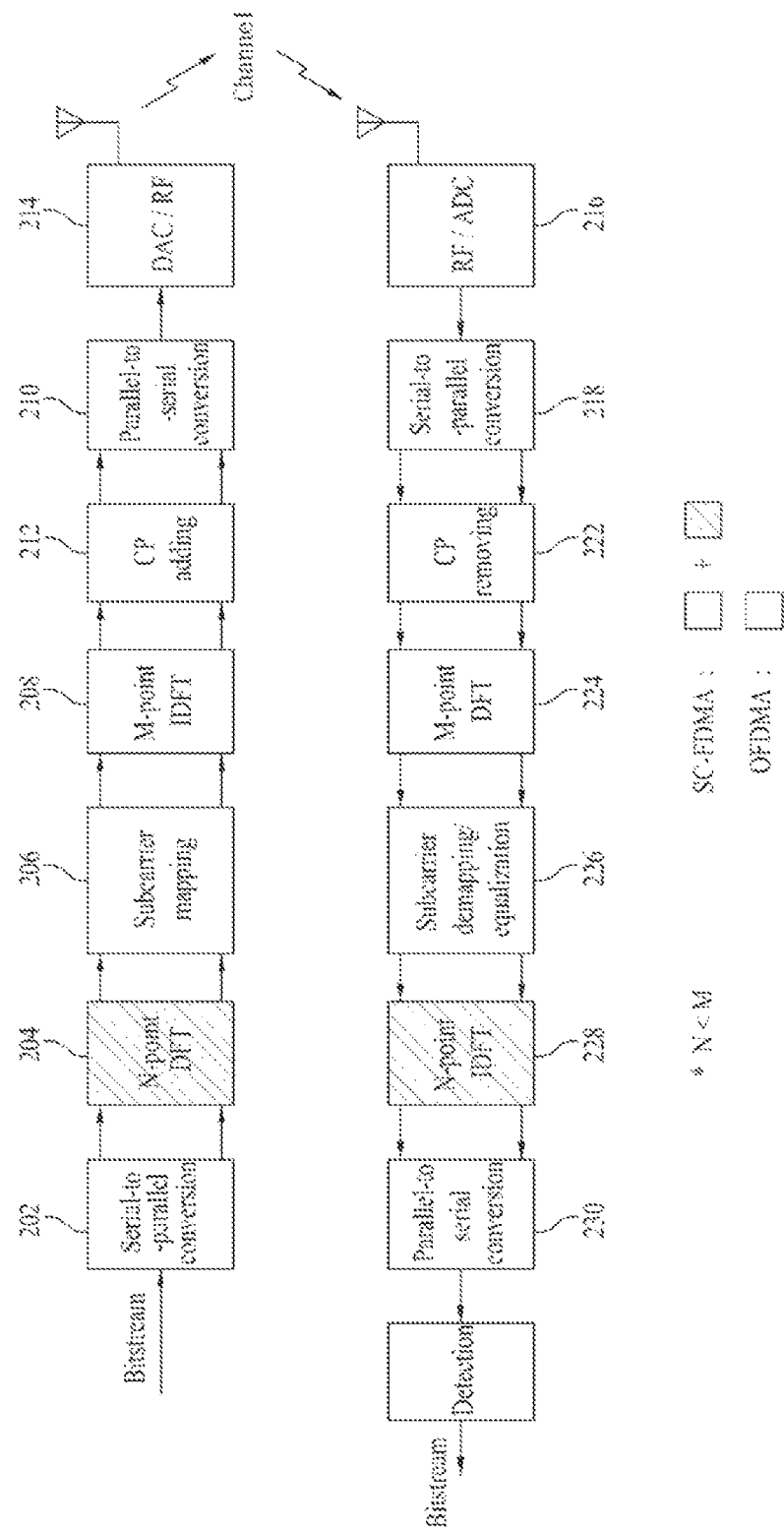
FIG. 2 is a block diagram showing a transmitter and a receiver for OFDMA and SC-FDMA.

FIG. 2 is a block diagram showing a transmitter and a receiver for OFDMA and SC-FDMA. In uplink, a transmitter (202-214) is a part of a UE and a receiver (216-230) is a part of an eNode B (or a BS). In downlink, the transmitter is a part of the BS and the receiver is a part of the UE.

Referring to FIG. 2, an OFDMA transmitter includes a serial-to-parallel converter 202, a subcarrier mapping module 206, an M-point Inverse Discrete Fourier Transform (IDFT) module 208, a Cyclic Prefix (CP) adding module 210, a parallel-to-serial converter 212, and a Radio Frequency (RF)/Digital-to-Analog Converter (DAC) module 214.

Signal processing in the OFDMA transmitter proceeds as follows. First, a bitstream is modulated into a data symbol sequence. The bitstream may be obtained by performing various types of signal processing including channel encoding, interleaving, scrambling, etc. on a data block delivered from a Medium Access Control (MAC) layer. The bitstream is also referred to as a codeword and is equivalent to a data block received from the MAC layer. The data block received from the MAC layer is referred to as a transport block as well. A modulation scheme may include, without being limited to, Binary Phase Shift Keying (BPSK), Quadrature Phase Shift Keying (QPSK), and n-Quadrature Amplitude Modulation (n-QAM). Next, a serial data symbol sequence is converted into N data symbols in parallel (202). The N data symbols are mapped to N subcarriers allocated among a total of M subcarriers and the (M-N) remaining subcarriers are padded with 0s (206). The data symbol mapped in a frequency domain is converted to a time-domain sequence through M-point IDFT processing (208). Thereafter, in order to reduce Inter-Symbol Interference (ISI) and Inter-Carrier Interference (101), an OFDMA symbol is generated by adding a CP to the time-domain sequence (210). The generated parallel OFDMA symbol is converted into a serial OFDMA symbol (212). The OFDMA symbol is then transmitted to a receiver through digital-to-analog conversion, frequency up-conversion, and the like (214). Available subcarriers among the (M-N) remaining subcarriers are allocated to another user. Meanwhile, an OFDMA receiver includes an RF/Analog-to-Digital Converter (ADC) module 216, a serial-to-parallel converter 218, a CP removing module 220, an M-point Discrete Fourier Transform (DFT) module 222, a subcarrier demapping/equalization module 224, a parallel-to-serial converter 228, and a detection module 230. A signal processing process of the OFDMA receiver has a configuration reverse to that of the OFDMA transmitter.

Compared to the OFDMA transmitter, an SC-FDMA transmitter further includes an N-point DFT module 204 located before the subcarrier mapping module 206. The SC-FDMA transmitter spreads a plurality of pieces of data to a frequency domain through DFT prior to IDFT processing, thereby considerably decreasing a Peak-to-Average Power Ratio (PAPR) of a transmission signal in comparison with an OFDMA scheme. Compared to the OFDMA receiver, an SC-FDMA receiver further includes an N-point IDFT module 226 located after the subcarrier demapping module 224. A signal processing process of the SC-FDMA receiver has a configuration reverse to that of the SC-FDMA transmitter.

Figure 3:
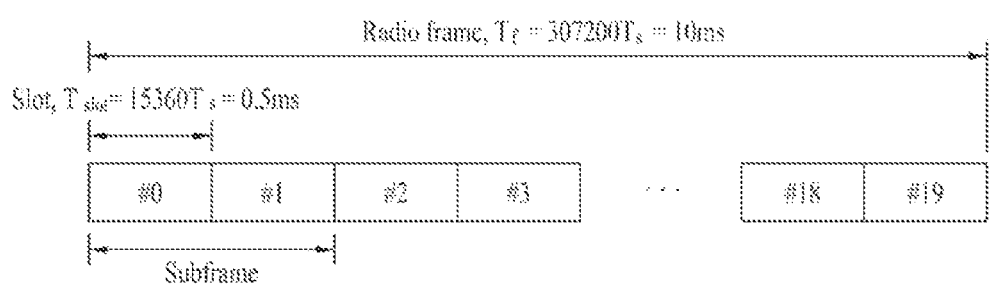
FIG. 3 is a diagram showing the structure of a radio frame used in an LTE system.

FIG. 3 is a diagram showing the structure of a radio frame used in an LTE system.

Referring to FIG. 3, a radio frame has a length of 10 ms (327200 $T_s$) and includes 10 equally sized subframes. Each of the subframes has a length of 1 ms and includes two slots. Each of the slots has a length of 0.5 ms (15360 $T_s$). In this case, $T_s$ denotes sampling time, and is represented by $T_s=1/(15\ kHz \times 2048)=3.2552 \times 10^{-8}$ (about 33 ns). Each slot includes a plurality of OFDM symbols in a time domain and includes a plurality of Resource Blocks (RBs) in a frequency domain. In the LTE system, one RB includes 12 subcarriers×7 (or 6) OFDMA (or SC-FDMA) symbols. A Transmission Time Interval (TTI) which is a unit time for data transmission may be determined in units of one or more subframes. The above-described radio frame structure is purely exemplary and various modifications may be made in the number of subframes within the radio frame, the number of slots within the subframe, and the number of OFDMA (or SC-FDMA) symbols within the slot.

Figure 4:
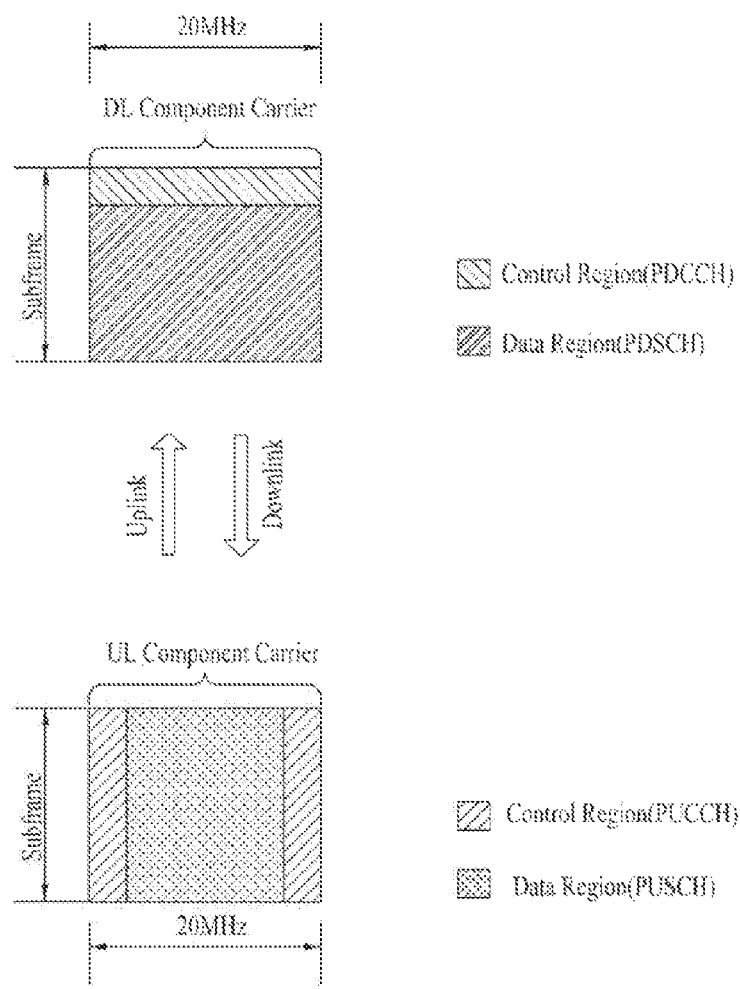
FIG. 4 is a diagram showing an example of performing communication in a single component carrier environment.

FIG. 4 is a diagram showing an example of performing communication in a single component carrier environment. FIG. 4 may correspond to an example of communication in an LTE system. In a Frequency Division Duplex (FDD) scheme, data transmission/reception is performed through one downlink band and through one uplink band corresponding to the downlink band. Specifically, in the FDD scheme, the radio frame structure of FIG. 4 is used only for downlink transmission or uplink transmission. In a TDD scheme, on the other hand, the same frequency band is divided into a downlink duration and an uplink duration corresponding to the downlink duration in a time domain. Specifically, in the TDD scheme, the radio frame structure of FIG. 4 is distinguished from downlink transmission and uplink transmission corresponding to the downlink transmission.

An HARQ process performed by a UE will now be described with reference to FIG. 4. In the LTE system, control information (e.g. scheduling information) for downlink data transmission of a BS is transmitted to a UE through a downlink control channel which is configured in a control region of a downlink subframe. The downlink control channel includes a Physical Downlink Control Channel (PDCCH). After receiving the scheduling information (e.g. a resource to which data is allocated, a data size, a coding scheme, a redundancy version, etc.) through the control channel, the UE may receive scheduled data through a downlink shared channel indicated by the scheduling information. The downlink shared channel includes a Physical Downlink Shared Channel (PDSCH). Next, the UE may transmit a reception response signal (e.g. HARQ ACK/NACK) for the downlink data to the BS through an uplink control channel which is configured in a control region of an uplink subframe. The uplink control channel includes a Physical Uplink Control Channel (PUCCH). For convenience, HARQ ACK/NACK will be denoted by ACK/NACK. After receiving the ACK/NACK signal from the UE, the BS retransmits downlink data indicated by a NACK signal. When the BS transmits a plurality of downlink data to the UE, a HARQ process may be performed with respect to each transport block corresponding to each downlink data.

Figure 5:
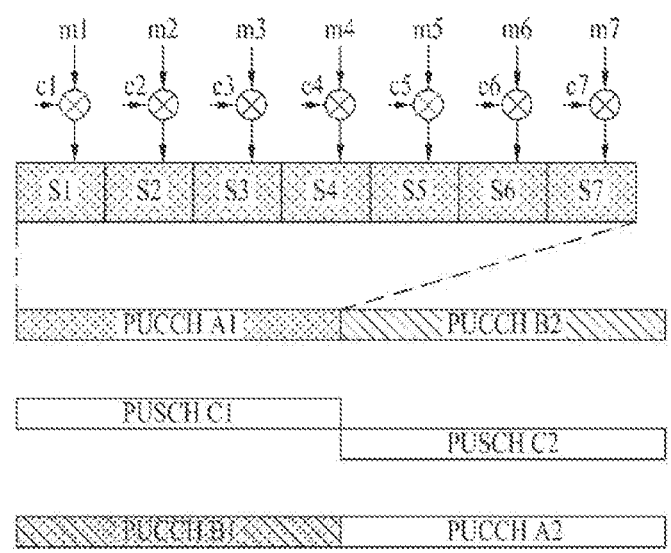
FIG. 5 is a diagram showing the structure of an uplink subframe used in an LTE system.

FIG. 5 is a diagram showing the structure of an uplink subframe used in an LTE system.

Referring to FIG. 5, an uplink subframe includes a plurality of slots (e.g. two slots). A slot may include a different number of SC-FDMA symbols according to the length of a CP. For example, in a normal CP case, a slot may include 7 SC-FDMA symbols. The uplink subframe is divided into a data region and a control region. The data region includes a Physical Uplink Shared Channel (PUSCH) and is used to transmit data signals such as voice. The control region includes a PUCCH and is used to transmit control information. The PUCCH includes an RB pair (e.g. m=0, 1, 2, and 3) located at both ends of the data region in a frequency domain and hops using a slot as a boundary. The control information includes ACK/NACK, CQI, PMI, RI, etc. The PUSCH and the PUCCH are not transmitted at the same time. The following Table 1 shows characteristics of the PUCCH format described in the 3GPP TS 26.211 Release-8.

TABLE 1

| PUCCH format | Modulation scheme | Number of bits per subframe, $M_{bit}$ |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

Figure 6:
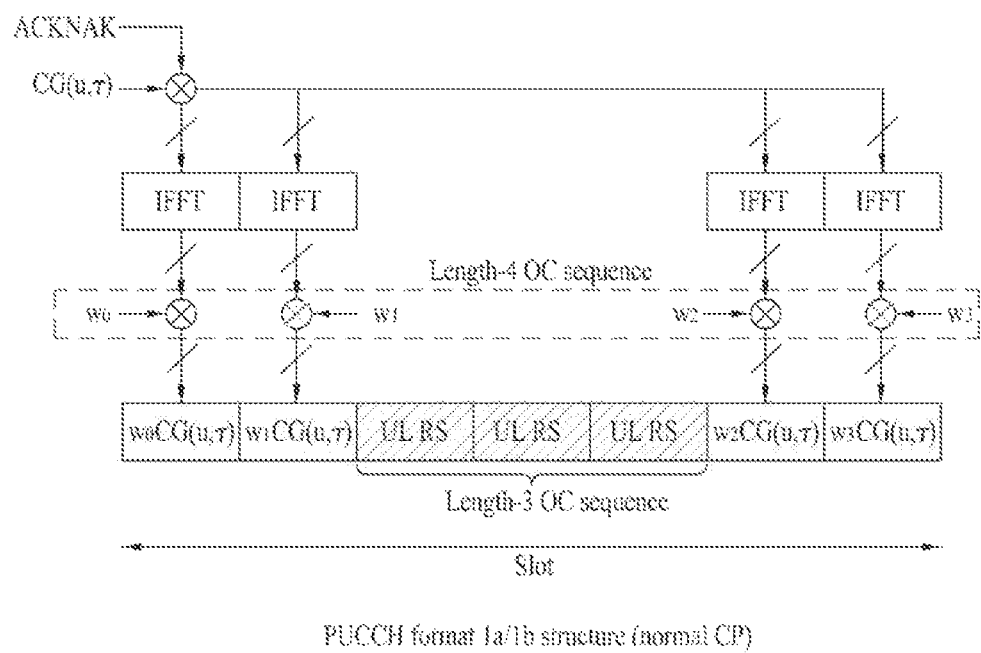
FIG. 6 is a diagram explaining a method of applying PUCCH formats 1a and 1b in a normal CP case.

FIG. 6 is a diagram explaining a method of applying PUCCH formats 1a and 1b in a normal CP case.

Referring to FIG. 6, in normal CP, uplink Reference Signals (UL RS) are conveyed in three successive symbols located in the middle of a slot and control information (i.e. ACK/NACK) is conveyed in the four remaining symbols. ACK/NACK signals from a plurality of UEs are multiplexed to one PUCCH resource using a CDM scheme. The CDM scheme is implemented using a Cyclic Shift (CS) of a sequence for frequency spread and/or an Orthogonal Cover (OC) sequence for time spread. For example, ACK/NACK signals are distinguished using different CSs (frequency spread) of a Computer Generated Constant Amplitude Zero Auto Correlation (CG-CAZAC) sequence and/or different Walsh/DFT OC sequences (time spread). Even if w0, w1, w2, and w3 multiplied after IFFT are multiplied before the IFFT, the same result is obtained. In the LTE system, a PUCCH resource for transmitting ACK/NACK signals is expressed by a combination of the position of a frequency-time resource (e.g. an RB), a CS of a sequence for frequency spread, and an OC sequence for time spread. Each PUCCH resource is indicated using a PUCCH resource (index).

Figure 7:
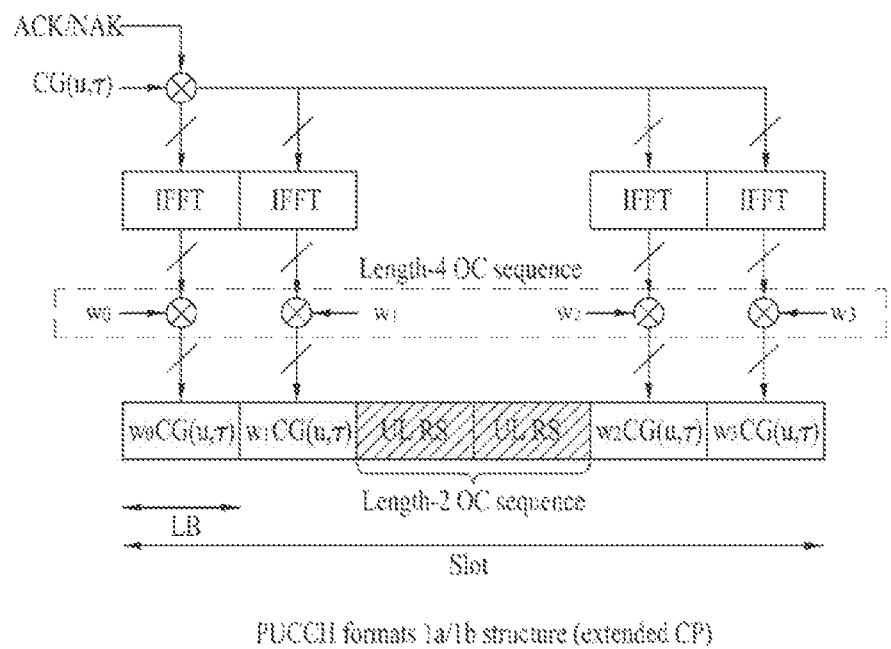
FIG. 7 is a diagram explaining a method of applying PUCCH formats 1a and 1b in an extended CP case.

FIG. 7 is a diagram explaining a method of applying PUCCH formats 1a and 1b in an extended CP case.

Compared with the normal CP case shown in FIG. 6, the extended CP case has a difference in that a slot includes 6 symbols and Reference Signals (RSs) are conveyed in the third and fourth symbols.

Figure 8:
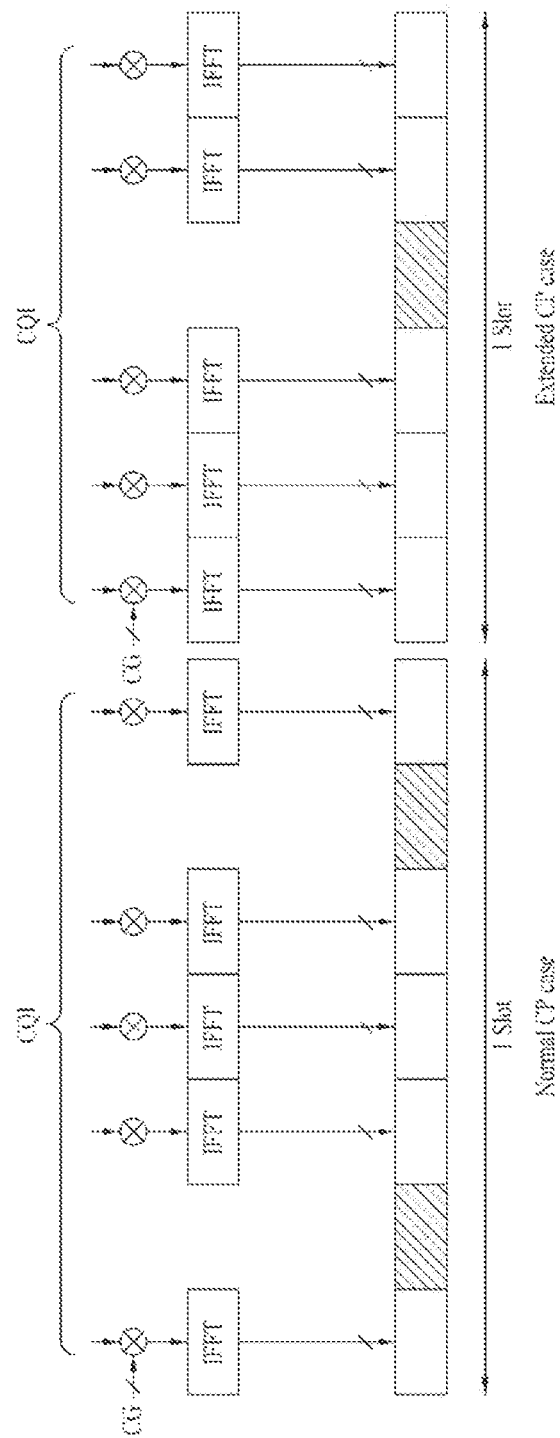
FIG. 8 is a diagram showing a slot level structure for PUCCH formats 2/2a/2b.

FIG. 8 is a diagram showing a slot level structure for PUCCH formats 2/2a/2b.

Referring to FIG. 8, in a normal CP case, one subframe includes 10 QPSK data symbols in addition to 4 RS symbols. Namely, each QPSK symbol is spread by a CS using CQI bits encoded to 20 bits at an SC-FDMA symbol level. CS hopping of an SC-FDMA symbol level is applicable to randomize intercell interference. An RS may be multiplexed through CDM using CS. Meanwhile, in an extended CP case, one subframe includes 10 QPSK data symbols in addition to 2 RS symbols.

Figure 9:
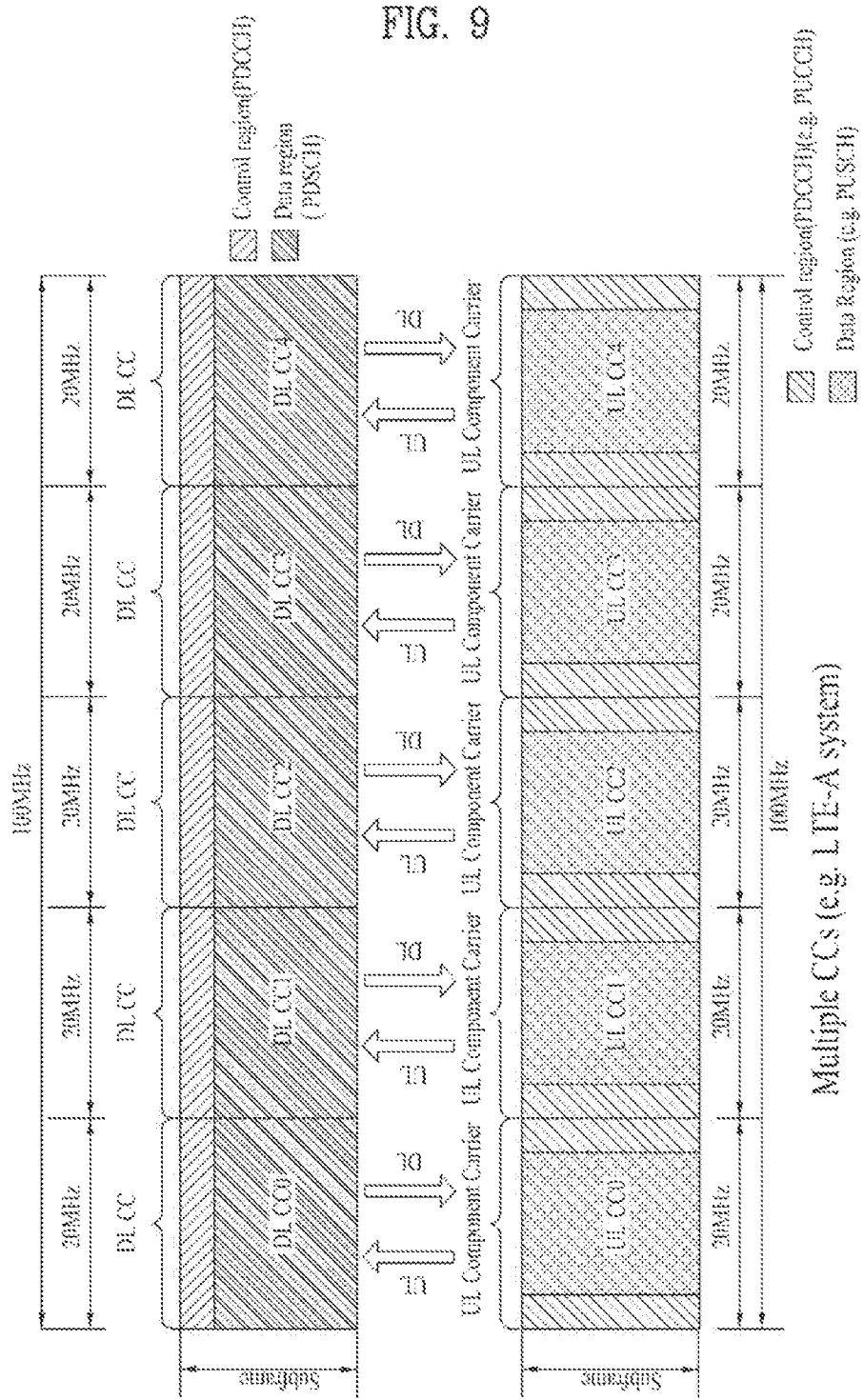
FIG. 9 is a diagram showing an example of performing communication in a multiple component carrier environment.

FIG. 9 is a diagram showing an example of performing communication in a multiple component carrier environment. FIG. 9 may correspond to an example of communication of an LTE-A system. The LTE-A system uses carrier aggregation or bandwidth aggregation technology which uses a wider uplink/downlink bandwidth by aggregating a plurality of uplink/downlink frequency blocks in order to employ a wider frequency band. Each frequency block is transmitted using a Component Carrier (CC).

Referring to FIG. 9, five 20 MHz CCs per each of uplink/downlink may support a bandwidth of 100 MHz. The respective CCs may be contiguous or non-contiguous in a frequency domain. The radio frame structure shown in FIG. 3 may be equally applied even when multiple CCs are used. However, since the radio frame, subframe, and slot are a time unit, a BS and a UE, for example, may transmit and receive signals through a plurality of CCs in one subframe. For convenience, FIG. 9 shows the case where a bandwidth of an uplink CC is the same as a bandwidth of a downlink CC and they are symmetrical. However, a bandwidth of each CC may be independently determined. For example, a bandwidth of the uplink CC may be configured as 5 MHz (UL CC0)+20 MHz (UL CC1)+20 MHz (UL CC2)+20 MHz (UL CC3)+5 MHz (UL CC4). It is also possible to configure asymmetric carrier aggregation in which the number of uplink CCs is different from the number of downlink CCs. Asymmetric carrier aggregation may be generated due to limitation of available frequency bands or may be intentionally made by network configuration. Although an uplink signal and a downlink signal are transmitted through CCs which are mapped one to one, CCs through which signals are actually transmitted may vary according to network configuration or signal types. For example, a CC through which a scheduling command is transmitted and a CC through which data is transmitted according to the scheduling command may differ. Furthermore, uplink/downlink control information may be transmitted through a specific uplink/downlink CC irrespective of whether mapping between CCs has been performed.

The current LTE system specification defines two reference symbols per slot in a PUCCH format 2 series. According to the current specification, if the length of a subframe is decreased, the performance a reference symbols for data demodulation is reduced. For example, in the case of a relay backhaul or sounding RS puncturing, at least one OFDM symbol is used as a transmission/reception guard symbol or a sounding reference symbol. Accordingly, the total number of available OFDM symbols is reduced. Hereinafter, a new PUCCH format which can relieve the reduction of the number of available OFDM symbols will be proposed.

Figure 10:
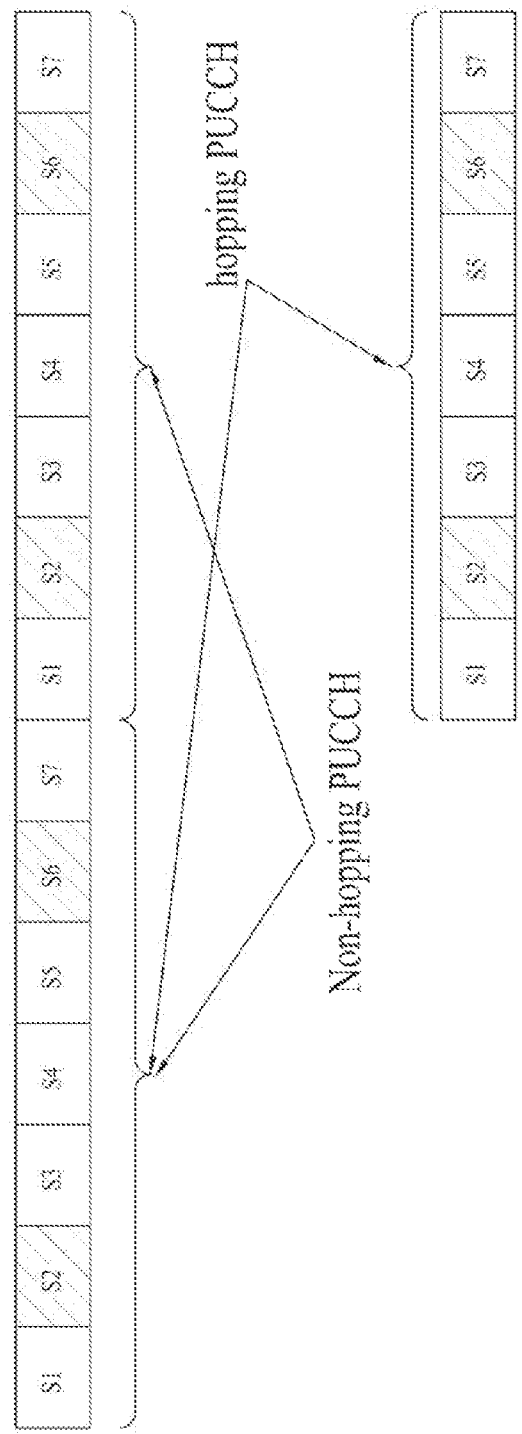
FIG. 10 is a diagram showing a subframe level structure for a PUCCH format 2.

FIG. 10 is a diagram showing a subframe level structure for a PUCCH format 2.

Referring to FIG. 10, in the current LTE system, a first slot and a second slot, for the same PUCCH resource, differ in location. Namely, frequency resources for PUCCH transmission perform hopping using a slot as a boundary. However, in the LTE-A system, frequency hopping of a slot unit may not be performed in order to reduce reference symbol overhead. Generally, although a channel may be robust by obtaining frequency diversity through hopping of a frequency resource, if a UE includes a plurality of antennas for uplink transmission, the frequency diversity can be obtained using a combination of different antennas. Therefore, frequency hopping may be excluded. That is, if a UE includes a plurality of antennas for uplink transmission, exclusion of frequency hopping may be considered to transmit much more control information.

In the present invention, a PUCCH format is effective when the number of available OFDM symbols for control data transmission in one subframe is reduced. Especially, the present invention is more effective when the first OFDM symbol of a subframe cannot be used, for example, when a guard symbol is needed as in an uplink backhaul between a relay and an eNB.

Another example is when the last OFDM symbol of a subframe cannot be used, for example, when the last OFDM is punctured as in the case in which a sounding RS is transmitted. According to the current specification, a sounding RS and a PUCCH are not permitted to be simultaneously transmitted. For instance, when the sounding RS is transmitted, a PUCCH format 2 series is dropped. On the contrary, when a PUCCH format 2 series is transmitted, the sounding RS is dropped. If both the PUCCH format 2 series and the sounding RS are transmitted, only fewer symbols than the 10 OFDM symbols defined to transmit current control data are used to transmit the control data.

To overcome such a problem, it is proposed to use a modulation symbol d(10) for a current PUCCH format 2a or 2b by using a conventionally specified reference symbol as a symbol for control data transmission. Namely, if 10 control data to be transmitted are present and only 9 OFDM symbol spaces which are capable of transmitting the control data are present, one additional OFDM symbol space is modulated and then transmitted by the modulation symbol d(10).

Based on the above concept, a PUCCH format for achieving the present invention may be divided into two cases. The first case is a method for transmitting control data through a reference symbol without changing a transmission location of a current reference symbol, and the second case is a method for maintaining compatibility with the legacy LTE system while changing the transmission location of a reference symbol.

First Embodiment

The first embodiment of the present invention defines a new PUCCH format under the assumption that the location of a reference symbol defined in a current specification is not changed. The new PUCCH format simply modulates one or more reference symbols selected for data symbol usage into control data symbols. In a normal CP case for example, one PUCCH subframe includes two reference symbols per slot, that is, a total of four reference symbols. Since a cover sequence is not applied to the reference symbols, one of two reference symbols per slot may be randomly selected for data symbol modulation.

Figure 11:
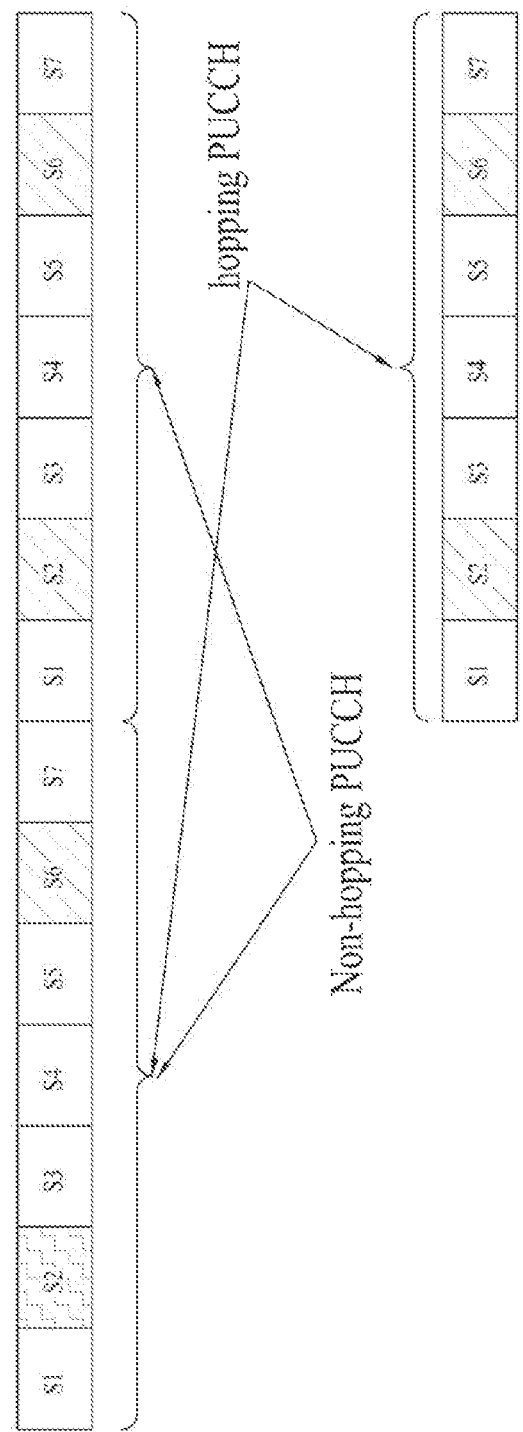
FIG. 11 is a diagram explaining a PUCCH format according to a first embodiment of the present invention.

FIG. 11 is a diagram explaining a PUCCH format according to a first embodiment of the present invention. Especially, in FIG. 11, a modulation symbol S2 of a first slot is used as a data symbol.

Referring to FIG. 11, modulation symbols S2 and S6 are defined in each slot. It is assumed that the symbol S2 of the first slot is used as the data symbol, and the symbol S6 of the first slot, and the symbols S2 and S6 of the second slot are intactly used as reference symbols.

The PUCCH format shown in FIG. 11 may be used for a relay uplink backhaul when a symbol 51 of the first slot is used as a guard symbol. Then the total number of OFDM symbols is 13. If the present invention is not applied, a total of 10 OFDM symbols for control data transmission is reduced to 9 symbols. This is inefficient in terms of coding rate or PUCCH coverage. Accordingly, if one reference symbol is reused as the data symbol as in the present invention, a total of 10 OFDM symbols for control data transmission can be ensured as in the case where the PUCCH format is not used for the relay uplink backhaul.

Figure 12:
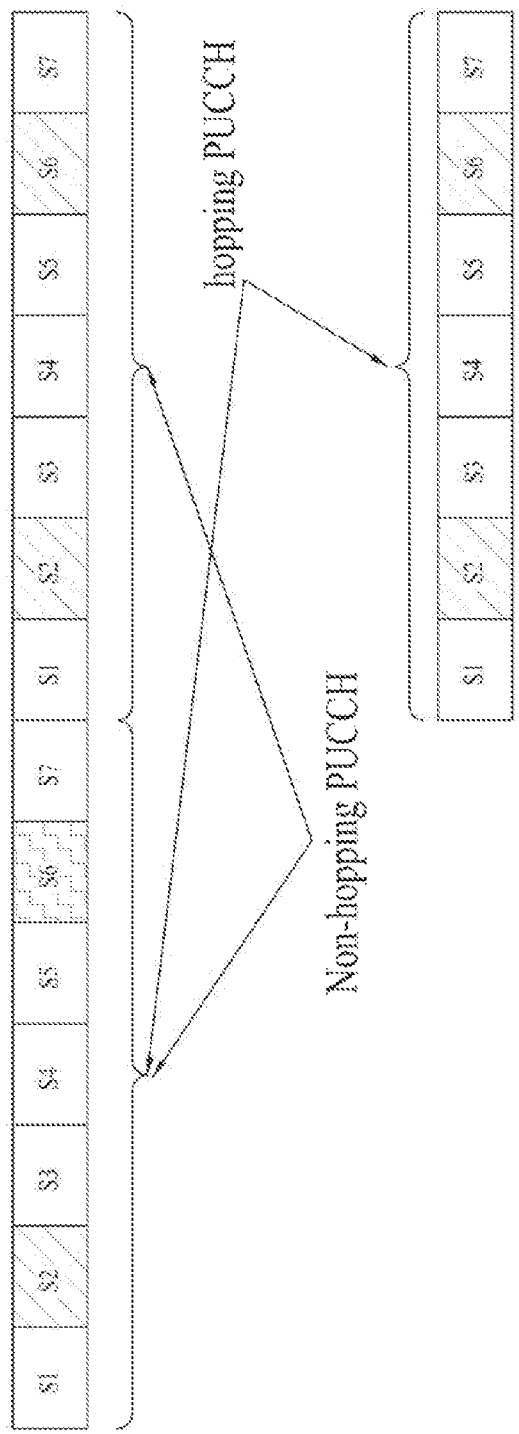
FIG. 12 is another diagram explaining a PUCCH format according to the first embodiment of the present invention.

FIG. 12 is another diagram explaining a PUCCH format according to the first embodiment of the present invention.

Referring to FIG. 12, a symbol S2 of a first slot is used for reference symbol transmission and a symbol S6 of the first slot is used for control data transmission. However, if a first symbol of a subframe is used as a guard symbol as in the relay uplink backhaul, a reference symbol is located at a start symbol and this structure is inefficient compared with FIG. 11 in terms of channel measurement.

Since it has been assumed in FIG. 11 and FIG. 12 that the guard symbol is defined in the first slot, a description of a reused OFDM symbol located in the first slot has been given. However, if the guard symbol is defined in a second slot, it is desirable that the reused OFDM symbol be located in a second slot.

Meanwhile, if frequency hopping of a slot unit is not implemented, reuse of a reference symbol for control data transmission can be increased up to a maximum of 3 OFDM symbols. If two reference symbols are reused, a combination thereof may be one of {S21, S61}, {S21, S22}, {S21, S62}, {S61, S22}, {S61, S62}, and {S22, S62}. Here, S21 denotes a symbol S2 of a first slot and S61 denotes a symbol S6 of the first slot. Similarly, S22 denotes a symbol S2 of a second slot and S62 denotes a symbol S6 of the second slot. If two reference symbols are reused, a combination thereof may be one of {521, S61, 522}, {521, S61, 562}, {521, S22, 562}, and {561, S22, 562}.

Second Embodiment

A second embodiment of the present invention defines a new PUCCH format under the assumption that the location of a reference symbol defined in a current specification is changed. Generally, if reference symbols are located only at one side of a subframe, channel measurement is not effective. Accordingly, the second embodiment proposes that compatibility with a preset PUCCH format 2 be maintained by using different CS values in an LTE system while ensuring a symbol space by changing the location of a reference symbol.

Figure 13:
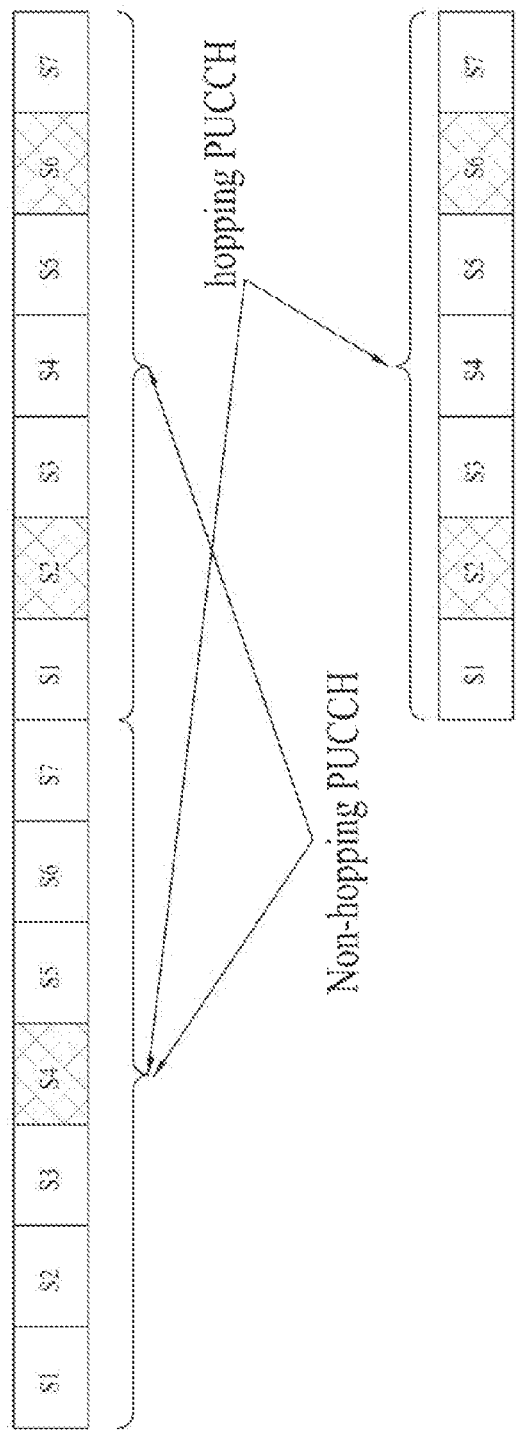
FIG. 13 is a diagram explaining a PUCCH format according to a second embodiment of the present invention.

FIG. 13 is a diagram explaining a PUCCH format according to a second embodiment of the present invention. It is assumed in FIG. 13 that one reference symbol is defined in a first slot.

Referring to FIG. 13, an existing reference symbol in the first slot is reused for data symbol transmission and one new reference symbol is defined in the first slot. The new reference symbol may be located at a symbol S4 or S5 of the first slot. If all OFDM symbols included in the first slot are available, it is desirable that the new reference symbol be located in the symbol S4 which is in the middle of the first slot.

However, if one or more OFDM symbols in the first slot are dropped, it is desirable that the new reference symbol be located at the symbol S5 of the first slot. In this case, a method using a PUCCH format 2 of an extended CP case may be considered. A second slot may have compatibility with the PUCCH format 2a or 2b.

Figure 14:
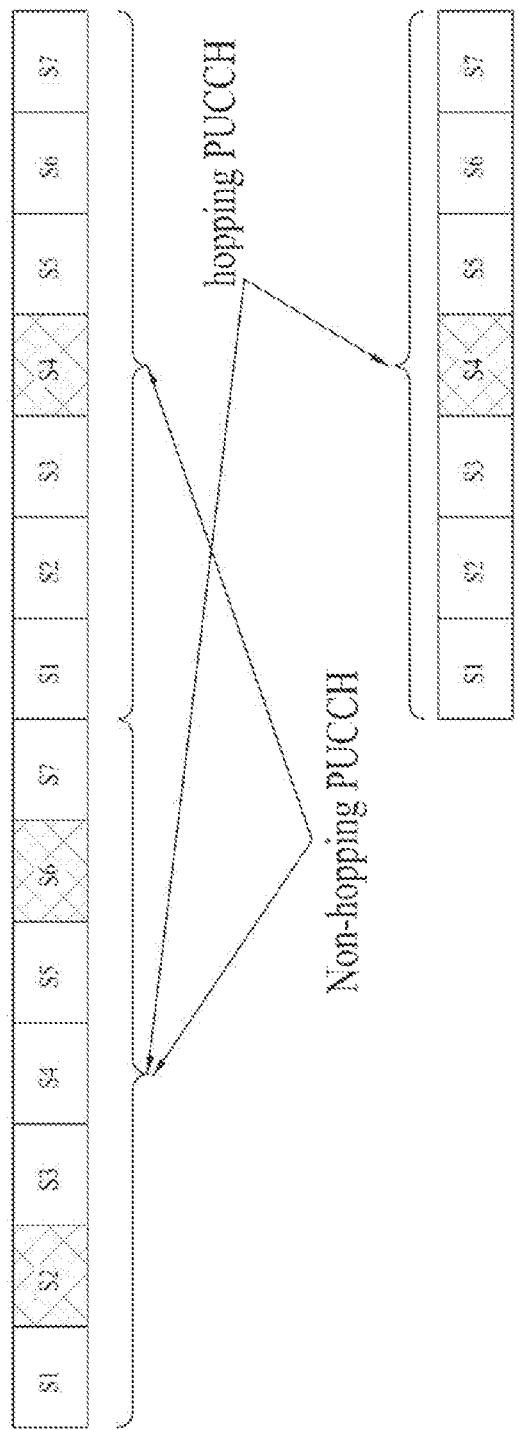
FIG. 14 another diagram explaining a PUCCH format according to the second embodiment of the present invention.

FIG. 14 is another diagram explaining a PUCCH format according to the second embodiment of the present invention. It is assumed in FIG. 14 that one reference symbol is defined in a second slot.

Referring to FIG. 14, an existing reference symbol in the second slot is reused for data symbol transmission and one new reference symbol is defined in the second slot. The new reference symbol may be located at a symbol S3, S4, or S5 of a first slot. If all OFDM symbols included in the second slot are available, it is desirable that the new reference symbol be located in the symbol S4 which is in the middle of the second slot.

However, if one or more OFDM symbols are dropped at an end of a subframe, it is desirable that the new reference symbol be located at the symbol S3 of the second slot. Meanwhile, the new reference symbol may be located at the symbol S5 of the second slot to maintain similarity with the PUCCH format 2 of an extended CP. In this case, the first slot may have compatibility with the PUCCH format 2a or 2b.

Figure 15:
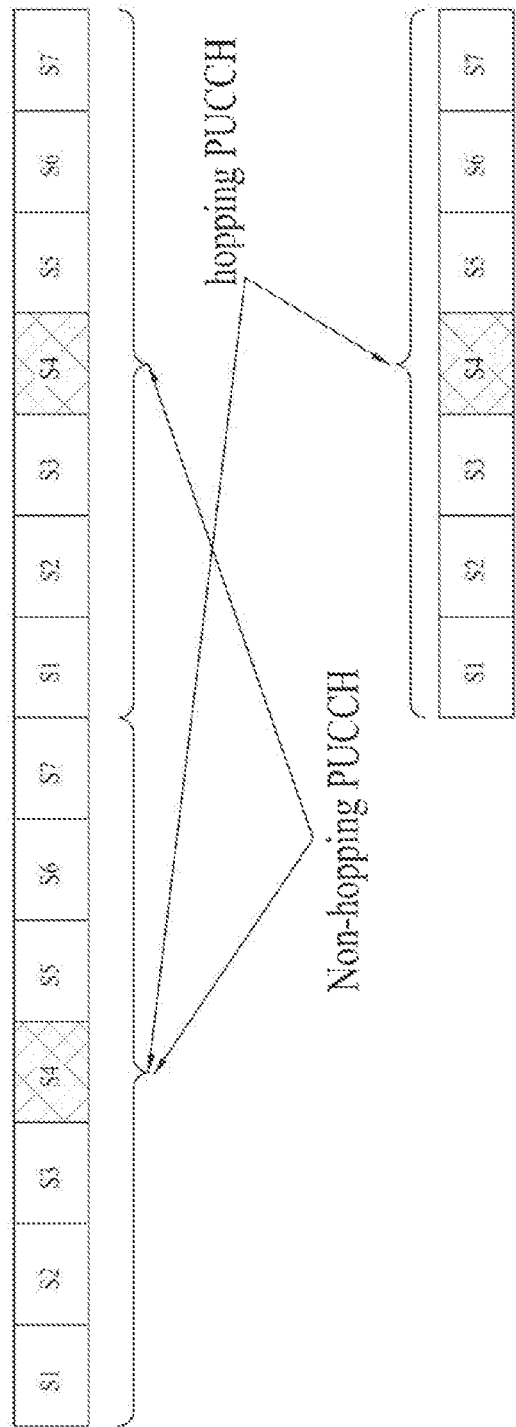
FIG. 15 is still another diagram explaining a PUCCH format according to the second embodiment of the present invention.

FIG. 15 is still another diagram explaining a PUCCH format according to the second embodiment of the present invention. It is assumed in FIG. 15 that one reference symbol is defined in both a first slot and a second slot.

Referring to FIG. 15, if an OFDM symbol dropped in any one of first and second slots occurs, it may be defined that the location of a reference symbol is changed to be located in the middle of a slot in which the dropped symbol is present or to be identical to the structure of the PUCCH format 2 of an extended CP case.

Meanwhile, if frequency hopping of a slot unit is not applied, one of two new reference symbols may be used to transmit control data. In more detail, if frequency hopping of a slot unit is not applied, only one reference symbol per subframe may be present, and in this case, the reference symbol may be located in any OFDM symbol of the subframe. However, for best channel measurement performance, the reference symbol is desirably located in the middle of the subframe in consideration of available OFDM symbols. For example, if all OFDM symbols are available, the reference symbol may be located in a symbol S7 of a first slot or a symbol S1 of a second slot. If one symbol of the first slot is dropped, best selection may be to define the location of the reference symbol in the symbol S1 of the second slot. Similarly, if one symbol of the second slot is dropped, best selection may be to define the location of the reference symbol in the symbol S7 of the first slot.

According to the structure of the PUCCH format of the above-described embodiments of the present invention, since there is no limitation as to symbol space, PUCCH format 2 control data and a sounding RS can be simultaneously transmitted.

Figure 16:
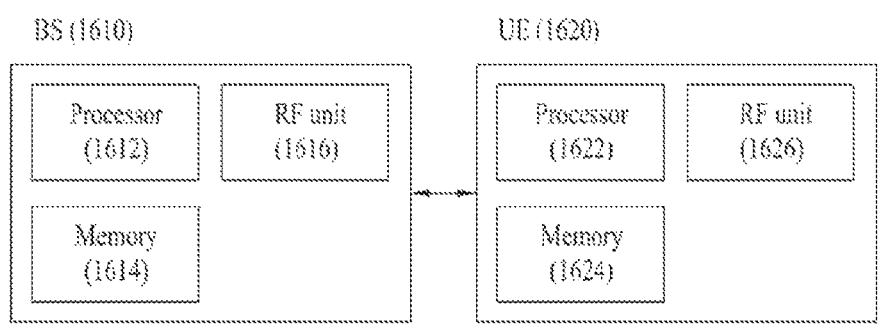
FIG. 16 is a diagram showing a BS and a UE that are applicable to the embodiments of the present invention.

FIG. 16 is a diagram showing a BS and a UE that are applicable to the embodiments of the present invention.

Referring to FIG. 16, a wireless communication system includes a BS 1610 and a UE 1620. In downlink, a transmitter is a part of the BS 1610 and a receiver is a part of the UE 1620. In uplink, the transmitter is a part of the UE 1620 and the receiver is a part of the BS 1610. The BS 1610 and/or the UE 1620 may have a single antenna or multiple antennas.

The UE 1620 includes a processor 1622, a memory 1624, and an RF unit 1626. The processor 1622 may be configured to implement the procedures and/or methods proposed in the present invention. The memory 1624 is connected to the processor 1622 and stores various information related to the operation of the processor 1622. The RF unit 1626 is connected to the processor 1622 and transmits and receives radio signals. Namely, the RF unit 1626 includes a transmission module and a reception module.

The BS 1610 includes a processor 1612, a memory 1614, and an RF unit 1616. The processor 1612 may be configured to implement the procedures and/or methods proposed in the present invention. The memory 1614 is connected to the processor 1612 and stores various information related to the operation of the processor 1612. The RF unit 116 is connected to the processor 1612 and transmits and receives radio signals. Namely, the RF unit 1616 includes a transmission module and a reception module.

When an uplink control single is transmitted to the BS according to the embodiment of the present invention, the processor 1622 of the UE 1620 may transmit one or more reference symbols selected for a data symbol by simply performing modulation to control data symbols. Namely, in a normal CP case, one PUCCH subframe includes two reference symbols per slot, that is, a total of four reference symbols. Since a cover sequence is not applied to the reference symbol, one of two reference symbols per slot may be arbitrarily selected for data symbol modulation.

As described above, a new PUCCH format may be defined under the assumption that the location of a reference symbol defined in a current specification is not changed. Further, compatibility with the PUCCH format 2 preset in the LTE system may be maintained by using different CS values while ensuring a symbol space by changing the location of a reference symbol.

Specifically, if the subframe is a backhaul subframe for transmitting the uplink control signal to a relay BS, since a first symbol of a first slot is dropped, it is desirable that the first slot include one reference symbol for transmitting an RS and the one reference symbol be located in the middle symbol of the first slot.

If the uplink control signal and the sounding RS in the subframe are simultaneously transmitted, it is desirable that the second slot include one reference symbol for transmitting an RS. In this case, the one reference symbol is located in the middle symbol of symbols except for a symbol for the sounding RS in the second slot.

The above-described exemplary embodiments are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions of any one embodiment may be included in another embodiment and may be replaced with corresponding constructions of another embodiment. It is apparent that the embodiments may be constructed by a combination of claims which do not have an explicit cited relation in the appended claims or may include new claims by amendment after application.

In the present document, a description has been made of a data transmission and reception relationship between a UE and a BS. Here, a specific operation described as performed by the BS may be performed by an upper node of the BS. Namely, it is apparent that, in a network comprised of a plurality of network nodes including the BS, various operations performed for communication with the UE may be performed by the BS, or network nodes other than the BS. The term BS may be replaced with the terms fixed station, Node B, eNode B (eNB), access point, etc. The term UE may be replaced with the terms Mobile Station (MS), Mobile Subscriber Station (MSS), etc.

The exemplary embodiments of the present invention may be achieved by various means, for example, hardware, firmware, software, or a combination thereof. In a hardware configuration, the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the exemplary embodiments of the present invention may be achieved by a module, a procedure, a function, etc. performing the above-described functions or operations. Software code may be stored in a memory unit and executed by a processor. The memory unit may be located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention may be applied to a wireless communication system. Specifically, the present invention may be applied to a method and apparatus for transmitting an uplink control signal to a BS in a UE of a wireless communication system.

The invention claimed is:

1. A method for transmitting an uplink control signal in a user equipment of a wireless communication system, the method comprising:

generating an uplink control signal;

transmitting the uplink control signal to a base station on allocated uplink transmission resources, wherein time resources of the uplink transmission resources comprise subframes, each of the subframes being divided into two slots, wherein at least one slot of the two slots includes only one reference symbol for transmitting a reference signal, when the uplink control signal and one of a sounding reference signal and a guard symbol are transmitted simultaneously on an identical subframe, wherein each of the two slots comprises one reference symbol, when frequency hopping of a slot unit is applied, wherein the subframe comprises only one reference symbol, when the frequency hopping of a slot unit is not applied.

2. The method according to claim 1, wherein, when the subframe is a backhaul subframe for transmitting the uplink control signal to a relay base station, a first symbol of a first slot of the two slots is used as the guard symbol.

3. The method according to claim 2, wherein the reference symbol is included in a second slot and located in a first symbol of the second slot, when the frequency hopping is not applied.

4. The method according to claim 1, wherein, when the uplink control signal and the sounding reference signal are simultaneously transmitted on the subframe, a last symbol of a second slot of the two slots is used for transmitting the sounding reference signal.

5. The method according to claim 4, wherein the reference symbol is included in a first slot and located in a last symbol of the first slot, when the frequency hopping is not applied.

6. A user equipment comprising:
   a processor for generating an uplink control signal; and
   a transmission module for transmitting the uplink control signal to a base station on allocated uplink transmission resources,
   wherein time resources of the uplink transmission resources comprise subframes, each of the subframes being divided into two slots,
   wherein at least one slot of the two slots includes only one reference symbol for transmitting a reference signal, when the uplink control signal and one of a sounding reference signal and a guard symbol are transmitted simultaneously on identical subframe,
   wherein each of the two slots comprises one reference symbol, when a frequency hopping of a slot unit is applied,
   wherein the subframe comprises only one reference symbol, when the frequency hopping of a slot unit is not applied.

7. The user equipment according to claim 6, wherein, when the subframe is a backhaul subframe for transmitting the uplink control signal to a relay base station, a first symbol of a first slot of the two slots is used as the guard symbol.

8. The user equipment according to claim 7, wherein the reference symbol is included in a second slot and located in a first symbol of the second slot, when the frequency hopping is not applied.

9. The user equipment according to claim 6, wherein, when the uplink control signal and the sounding reference signal are simultaneously transmitted on the subframe, a last symbol of a second slot of the two slots is used for transmitting the sounding reference signal.

10. The user equipment according to claim 6, wherein the reference symbol is included in a first slot and located in a last symbol of the first slot, when the frequency hopping is not applied.

* * * * *